United States Patent [19]

Clearman et al.

[11] 4,384,569

[45] May 24, 1983

[54] SOLAR ENERGY COLLECTOR/STORAGE SYSTEM

[76] Inventors: Francis R. Clearman, 5865 W. 2nd Ave., Lakewood, Colo. 80226; Jack R. Bettis, 800 Elmira St., Aurora, Colo. 80010

[21] Appl. No.: 237,553

[22] Filed: Feb. 24, 1981

[51] Int. Cl.³ .............................................. F24J 3/02
[52] U.S. Cl. .................................... 126/430; 126/436; 126/439; 126/449; 126/450
[58] Field of Search ............... 126/437, 439, 449, 450, 126/430, 436, 400, 444; 165/180; 252/70, 71

[56] References Cited

U.S. PATENT DOCUMENTS

| | | | |
|---|---|---|---|
| 1,074,219 | 9/1913 | Skiff . | |
| 2,484,127 | 10/1949 | Stelzer | 126/430 X |
| 3,102,532 | 9/1963 | Shoemaker | 126/270 |
| 3,194,228 | 2/1964 | Amat Bargues | 126/271 |
| 3,412,728 | 11/1968 | Thomason | 126/270 |
| 3,853,114 | 12/1974 | Gaydos, Jr. | 126/449 X |
| 3,939,819 | 2/1976 | Minardi | 126/271 |
| 3,973,552 | 8/1976 | Ervin | 126/271 |
| 4,049,046 | 9/1977 | Worthington | 126/444 X |
| 4,052,975 | 10/1977 | Ceideburg | 126/271 |
| 4,055,165 | 10/1977 | Scragg et al. | 126/400 |
| 4,059,226 | 11/1976 | Atkinson | 237/1 A |
| 4,069,809 | 1/1978 | Stand | 126/431 X |
| 4,072,141 | 2/1978 | Fillios et al. | 126/431 X |
| 4,111,189 | 9/1978 | Dizon | 126/436 X |
| 4,127,104 | 11/1978 | Greene | 126/437 X |
| 4,129,117 | 12/1978 | Harvey | 126/271 |
| 4,166,445 | 9/1979 | McGraw | 126/432 |
| 4,188,941 | 2/1980 | Hopkins | 126/449 X |
| 4,246,888 | 1/1981 | Jarzenbeck, Sr. | 126/449 X |

Primary Examiner—Larry Jones
Attorney, Agent, or Firm—Donald J. Singer; Jacob N. Erlich

[57] ABSTRACT

A solar energy collector/storage system which includes an insulated container having working fluid inlets and outlets and an opening, a light-transmitting member positioned over the opening, and a heat-absorbing member which is centrally situated, is supported in the container, and is made of a mixture of gypsum, lampblack, and water. A light-reflecting liner made of corrugated metal foil preferably is attached to the internal surface of the container. The opening of the container is positioned in optical alignment with a source of solar energy. A light-reflecting cover optionally can be hingedly attached to the container, and can be positioned such as to reflect solar energy rays into the container. The system is adaptable for use with a working gas (e.g., air) and/or a working liquid (e.g., water) in separated flows which absorb heat from the heat-absorbing member, and which are useable per se or in an associated storage and/or circulatory system that is not part of this invention. The heat-absorbing mixture can also contain glass fibers. The heat-absorbing member is of such great load-bearing strength that it can also be used simultaneously as a structural member, e.g., a wall or ceiling of a room; and, thereby, the system can be used to heat a room, if a window of the room is the light-transmitting member and is facing the sun, and if the heat-absorbing member is a wall and/or the ceiling of the room and receives solar energy through the window.

2 Claims, 7 Drawing Figures

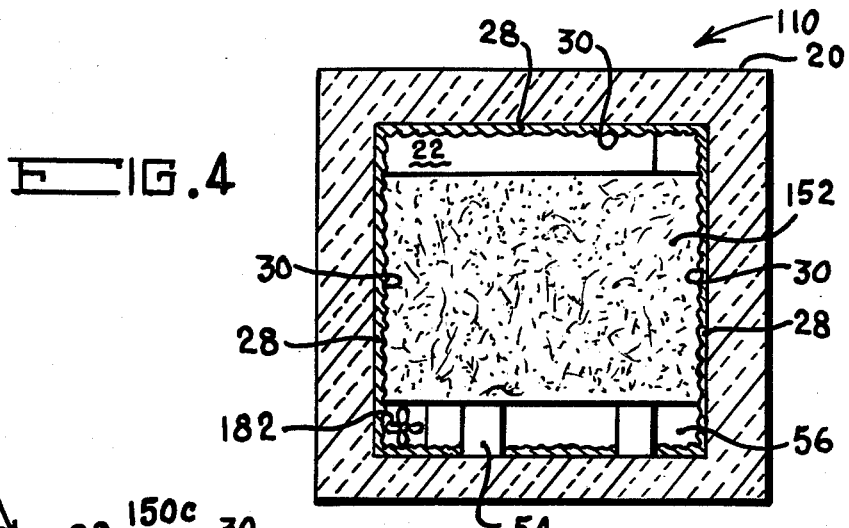
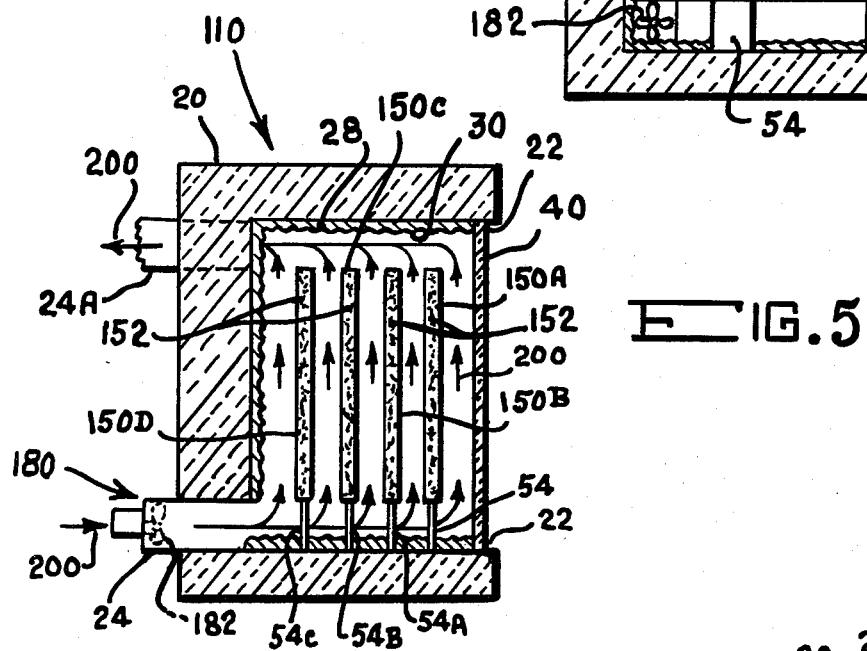
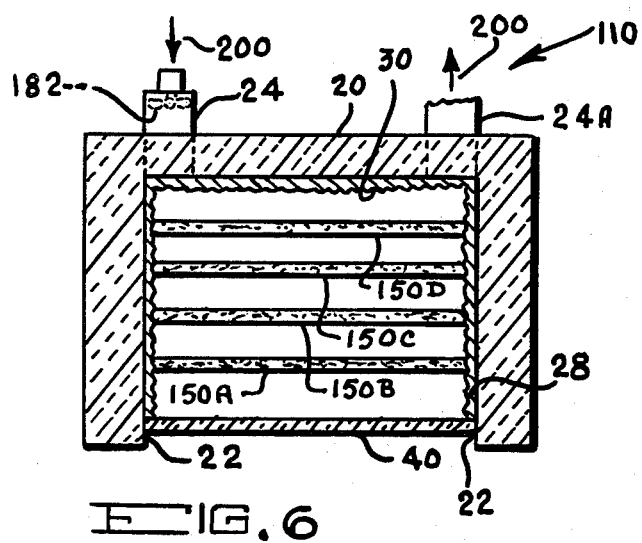
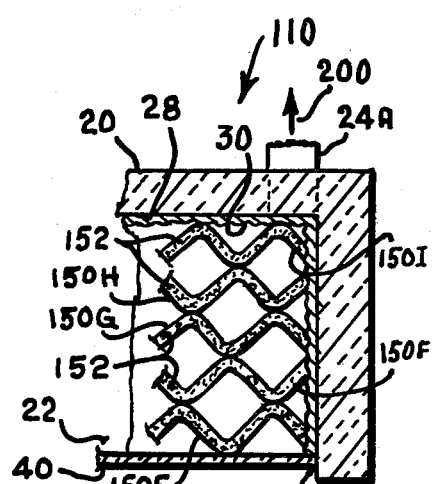

SOLAR ENERGY COLLECTOR/STORAGE SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to solar energy collector/storage systems and, more particularly, to such a system which is adaptable for use either with a working gas (e.g., air) or a working liquid (e.g., water), or with both simultaneously.

It is well known that the earth's supply of fossil fuels is being rapidly depleted. As a result, the search for means to supplement, and hopefully to replace, fossil fuels with renewal sources of energy has begun and is rapidly accelerating. It is equally well known that, other than nuclear-generated energy, the energy generated by the sun is the most readily available and also the cheapest source of renewal energy. Accordingly, it is not surprising that the technology for acquiring, retaining, and selectively using the energy generated by the sun and transmitted by the sun's rays is advancing rapidly. Nevertheless, it is fair and accurate to say that to date there is not available a solar energy collector/storage system which incorporates all of the following features and advantages: simple in structure; cheap to make or build, because the needed materials are plentiful, readily available, and economical in price; easy to install; economical to use; low in cost to maintain or repair; uses either a working gas or a working liquid, or both simultaneously; uses, as a heat-absorbing medium, materials in the form of a mixture which absorbs heat in large quantities, readily heats fluids flowing on, over, under or around it, and also is simultaneously useable as a structural unit (e.g., a wall, a ceiling, and like); and is highly efficient both as a collector means and as a storage means of solar energy.

SUMMARY OF THE INVENTION

The instant invention provides all of the above-mentioned advantages, and does so because of its novel structure and the unique nature of the contents of the mixtures which are useable simultaneously as heat-absorbing mediums and structurally-supporting members. Therefore, the instant invention constitutes a significant advance in the state-of-the-art.

Accordingly, it is the principal object of the invention to provide a uniquely structured solar energy collector/storage system.

It is another object of this invention to provide a new heat-absorbing medium which readily and quickly absorbs great quantities of heat, and which equally, readily and quickly heats fluids flowing in proximity to the medium.

It is still another object of this invention to provide a heat-absorbing medium in the form of a mixture of materials previously unused in the art.

It is yet another of this invention to provide a heat-absorbing medium which is also useable as a structural unit, such as a wall, a ceiling, and the like.

It is a further object of this invention to provide not only a highly effective solar energy collector, but also a highly efficient storage means for the collected heat.

It is a still further object of this invention to provide a solar energy collector/storage system in which the working medium is a fluid, and in which the working fluid used may be a gas or a liquid, or both simultaneously.

It is a yet still further object of this invention to provide a solar energy collector/storage system which concurrently is: simple in structure; cheap to make or build; easy to install; economical to use; and low in cost to maintain or repair.

These objects of this invention, as well as other objects related thereto, will become readily apparent after a consideration of the description of the invention, together with reference to the contents of the Figures of the drawing.

DESCRIPTION OF THE DRAWING

FIG. 4 is a front elevation view, in simplified pictorial and schematic form, and partially in cross section, of a variation of the preferred embodiment, in which said variation only air is used as the working fluid;

FIG. 5 is a side elevation view, in simplified pictorial and schematic form, and partially in cross section, of the variation of the preferred embodiment;

FIG. 6 is a top plan view, in simplified pictorial and schematic form, and partially in cross section, of the variation shown in FIGS. 5 and 6, and in which a cross section structural variation of the heat-absorbing medium is also shown; and FIG. 7 is a top plan view, in simplified pictorial and schematic form, and partially in cross section and partially fragmented, of the variation shown in FIGS. 5 and 6, and in which another cross sectional structural variation of the heat-absorbing medium is also shown.

DETAILED DESCRIPTION OF THE PREFERRED EMBODIMENT AND VARIATIONS THEREOF

Figure 1:
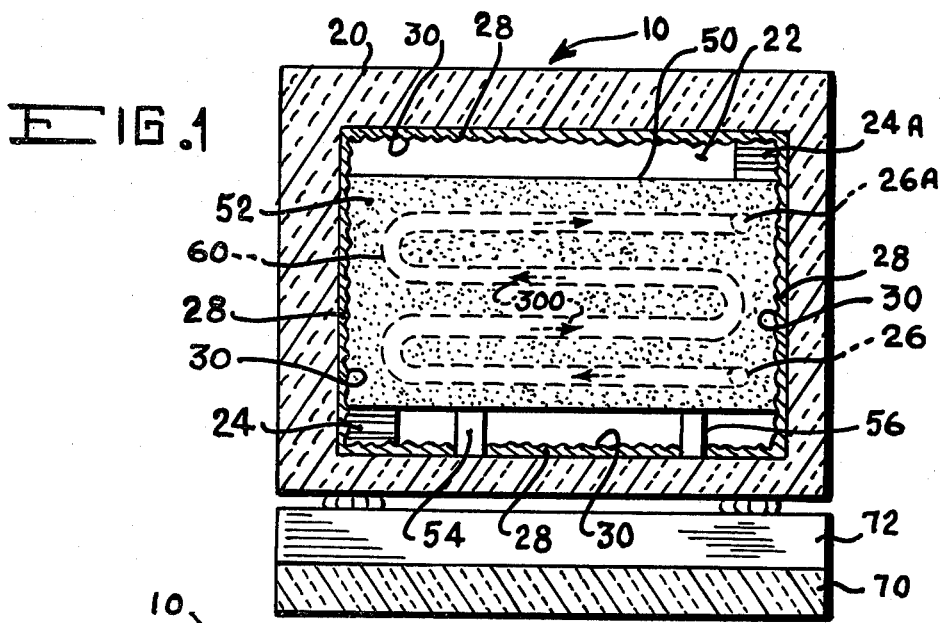
FIG. 1 is a front elevation view, in simplified pictorial and schematic form, of a preferred embodiment of the invention in which air or water, or both simultaneously (in separated flows) may be used as the working fluid.
Figure 2:
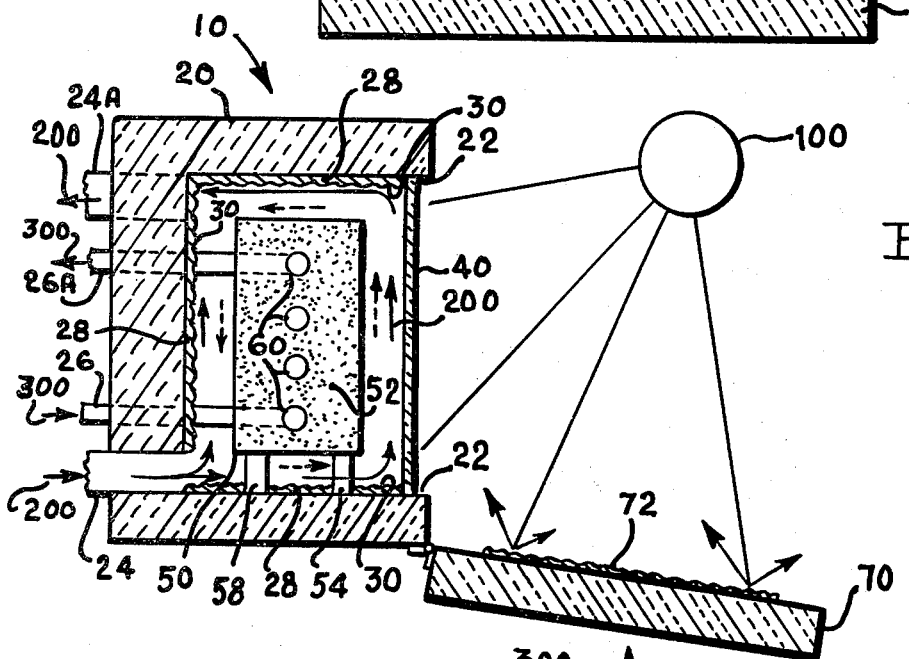
FIG. 2 is a side elevation view, in simplified pictorial and schematic form, and partially in cross section, of the preferred embodiment in its working environment.
Figure 3:
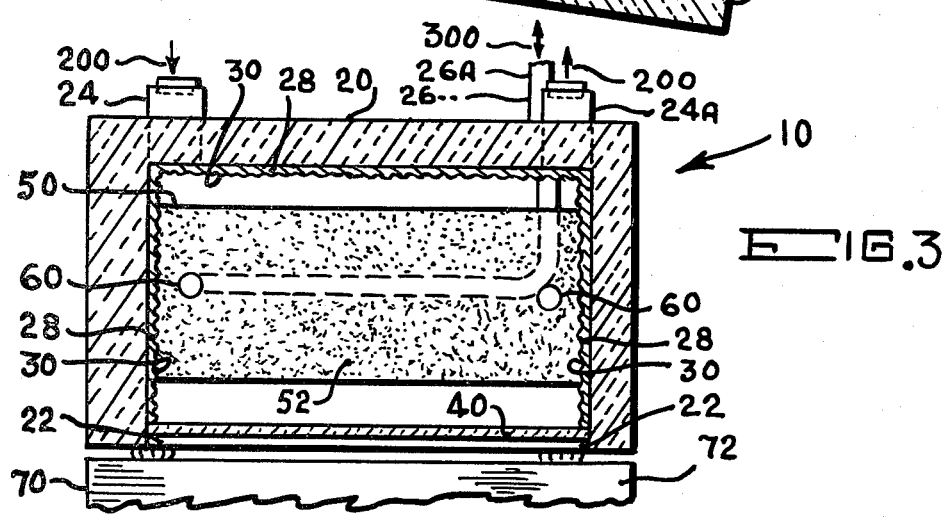
FIG. 3 is a top plan view, in simplified pictorial and schematic form, and partially in cross section and partially fragmented, of the preferred embodiment shown in FIGS. 1 and 2.

With reference to FIGS. 1-3, inclusive, therein is shown in various and diverse views (as hereinbefore explained), the preferred embodiment 10 of the inventive solar energy collector/storage system.

As a preliminary matter, it is to be noted and remembered that the term "light" is intended to mean, as it does in the solar energy art, "sunlight"; and, of course, the spectrum of sunlight extends beyond visible light, and includes not only visible light but also infrared and ultraviolet. It is also to be noted and remembered that the phrase "a source of solar energy" includes, but is not limited to, sunlight directly from the (earth's) sun itself. In other words, the sunlight may be received from, for example, a reflector from which the impinging sunlight is reflected.

Again with reference to FIGS. 1-3, inclusive, the preferred embodiment 10 comprises: an insulated container 20 having an opening 22 in optical alignment with a source of solar energy (as best shown in FIG. 2), e.g., the sun 100 itself, FIG. 2; an inlet (such as either 24 or 26A, or both) for a working fluid (such as either a gas 200 or a liquid 300, FIG. 2) an outlet (such as either 24A for inlet 24, or 26A for inlet 26, or both) for the working fluid, and an internal surface 28; a working fluid 200 and/or 300 (such as a gas, i.e., air 200; or a liquid, i.e., water 300) in the insulated container 20; a light-reflecting liner 30 disposed adjacent the internal surface 28 of the insulated container 20; a light-transmitting member 40 (i.e., a translucent or transparent member) disposed over the opening 22 of the container 20 such that the opening 22 is closed; and, at least one member 50 which is made of heat-absorbing material 52 disposed within the container 20.

The heat-absorbing material 52, of which the member(s) 50 is (are) made, comprises a mixture of gypsum (i.e., calcium sulfate, $CaSO_4.2H_2O$) in powdered form (e.g., in a finely divided solid state, particulate matter, pulverized, or the like), lampblack (i.e., an amorphous, practically pure form of carbon made by burning oil, coal tar, resin, or other carbonaceous substance in an insufficient supply of air; and, sometimes referred to as "carbon black") and a liquid, preferably water. The mixture is formed in a preselected desired and/or necessary shape, such as a block, by using a mold and allowing the mixture to set until it is firm and hard.

It is to be noted and remembered that the preferred embodiment 10, FIGS. 1-3, inclusive, is useable with a gas working fluid 200, or with a liquid working fluid 300, or with both simultaneously, although physically separated. Irrespective of what working fluid is used, the heat absorbing medium 50 is preferably in the form of a block which is also preferably centrally disposed within the insulated container by any conventional suitable support means, such as representative supports 54, 56 and 58, FIGS. 1 and 2.

If a working gas 200 is used, it is introduced into the container 20 through inlet 24 from a suitable source (not shown) and it is exited from the container 20 through outlet 24A which preferably is situated in a higher positionable relationship with regard to the inlet 24. The outlet 24A is connected to a suitable conventional means (not shown), such as a circulatory system, which makes use of the heated outflowing working gas 200. The inlet 24 and outlet 24A are preferably in the structural form of openable and closeable adjustable louvers.

When a working gas 200 is used, its flow path into, within, and out of the container 20 is structurally defined by the inlet 24, the perimeter of the heat-absorbing medium 50, the light-reflecting liner 30, the inner surface of the light-transmitting member 40, and the outlet 24A. It has been found that a secondary, and helpful flow, of the working gas 200 is established within the container 20 by the above-mentioned principal flow. This secondary flow is shown in FIG. 2 by dotted arrows and is essentially around the supported (or suspended) heat-absorbing medium 50.

If a working liquid 300, such as water, is used, it is introduced into the container 20 through inlet 26 from a suitable source (not shown) and it is exited from the container 20 through outlet 26A which is preferably situated at a higher level than inlet 26. The outlet 26A is connected to a suitable conventional means (not shown) either for storage of the heated outflowing working liquid 300 until later use, or to a circulatory system for distribution and use of the heated outflowing working liquid 300. Of course, flow control valves may be connected to the inlet 26 and/or the outlet 26A.

When a working liquid 300 is used, a liquid-impervious conduit 60 (preferably made of copper, and also preferably having a serpentine shape) is positioned within the heat-absorbing medium 50, with the inlet of the conduit 60 connected to the liquid impervious inlet 26 of the container 20, and with the outlet of the conduit 60 connected to the liquid impervious outlet 26A of the container 20. The flow of the working liquid 30 into the inlet 26, through the conduit 60, and out of the outlet 26A is as shown in FIGS. 1 and 2. It is here to be noted that the conduit 60 is positioned in the heat-absorbing medium 50 while the constituent mixture 52 is still soft.

Still with reference to FIGS. 1-3, inclusive, the solar energy collector/storage system 10 preferably also has, but need not have, an insulated cover 70 (or door) which is dimensioned and configured to fit on and overspread the light-transmitting 40 and the opening 22 in the container 20; has a light-reflecting liner 72 attached to the "internal" surface of the cover 70 which opposes the light-transmitting member 40, if the cover 70 were to be positioned such as to close the container 20; is attached to the container 20, and is selective movable (while so attached) such that the cover 70 is, in fact, useable to close and to open the container 20. As may be readily apparent, the cover 70 would normally be closed when the system 10 is no longer in use, or when the heated air 200 and/or water 300 are "captured" (by closing all inlets and outlets) and held for future use.

It is to be noted that as a matter of preference the cover 70 is also selectively positionable (by any suitable conventional means) such that the light-reflecting liner 72, which is attached to the cover 70, faces the source of solar energy 100, as is shown in FIG. 1.

Returning again to the structure of the container 20, its light-reflecting liner 30 is made of metal, preferably corrugated metal foil; and, its light-transmitting member 40 is preferably made of a light-transparent member such as glass, or "Plexiglas" (i.e., the trade name for transparent plastic material made from methyl methacrylate), although this member can be made of the readily available, translucent, corrugated, plastic sheeting in which fibers of glass are embedded. The container is insulated with any conventional insulating material, although "Styrofoam" (i.e., the trade name of an expanded, cellular polystyrene) or the like is preferred. The insulating material used should have an R value (i.e., an "R factor", or resistance to heat) of at least 30.

Now, returning again to the structure of the optional container cover 70, the liner 72 is made of metal, preferably corrugated metal foil; and, the cover 70 is insulated with any insulating material having a R value of at least 30. With regard to the liner 72, and with reference to FIG. 2, it is to be noted that the rays of the sunlight which impinge upon corrugated metal liner 72 will disperse somewhat, rather than being reflected entirely to and through light-transmitting member 40 of the container 20. Nevertheless, a sufficient amount of the impinging and dispersed rays will be reflected to the light-transmittive member 40 to warrant the use of the corrugation-configured metal liner 72. As a related matter, the cover 70 preferably is hingedly connected to the lower edge of the container 20 by suitable conventional means, such that the cover 70 will be downwardly movable only a preselected distance and is, and will continue to be, in optical alignment with the source of solar energy.

With reference to FIGS. 4-7, inclusive, therein is shown a variation 110 of the preferred embodiment 10 of the inventive solar energy collector/storage system.

The variation 110 is similar to the preferred embodiment 10 and, therefore, only the differences therebetween will be described, although the variation is shown in full detail in FIGS. 4-7, inclusive.

The principal difference in function between the variation 110 and the preferred embodiment 10 is that the variation 110 is useable only with a working gas, such as 200, and not with a working liquid; whereas, as hereinbefore shown and described, the preferred embodiment 10 is useable with a working gas 200 or a working liquid 300, or both simultaneously (if in separated flows).

A significant difference in structure is that in the variation 110 a plurality of members (such as 150A, 150B, 150C, and 150D, best shown in FIGS. 5 and 6) made of heat-absorbing material are used, rather than the preferred sole one member 50 in the embodiment 10. These heat-absorbing members of the plurality are disposed in spaced-apart relationship, and preferably the spacing therebetween is equal. In this regard, it is to be noted that these spaced-apart members of the variation 110 are also simultaneously disposed such that flow paths (as shown in FIG. 5) for the working gas 200 (which is, preferably, air) are defined by the air inlet 24, the light-reflecting liner 30, the space between the spaced-apart heat-absorbing members, the light-transmitting member 40, and the air outlet 24A.

Another significant difference in structure is that the heat-absorbing material 152 of which the members of the variation 110 are made is different than the heat-absorbing material 52 of which the member 50 of the preferred embodiment is made. More specifically, the heat-absorbing material 152 used in the variation 110 comprises a mixture of gypsum (i.e., in a finely divided solid state, particulate matter, pulverized, or the like), lampblack (i.e., an amorphous, practically pure form of carbon made by burning oil, coal tar, resin, or other carbonaceous substance in an insufficient supply of air; and, sometimes referred to as "carbon black"), glass fibers, and a liquid, preferably water. Stated another way, this mixture 152 includes glass fibers, while the mixture 52 of preferred embodiment 10 does not.

Still another significant difference in structure is that the heat-absorbing members of the variation 110 are formed in the shape of sheets, rather than the block shape of the preferred embodiment. In addition, the structural cross sectional shape of these sheet members may be varied. For example, representative sheets 150A-150D, inclusive, FIGS. 5 and 6, are in the structural cross sectional shape of thin flat sheet; whereas, representative sheets 150E-150I, inclusive, FIG. 7, are in the structural cross-sectional shape of corrugated sheets.

A further significant difference in structure is that the variation 110 incorporates a means (generally designated 180) for promoting flow of the working gas 200 into, through, and out of the container 20. This means 180 preferably includes a fan 182, FIGS. 4-6, inclusive, which is disposed in the inlet 24.

Two other significant structural differences are that the variation 110, unlike the preferred embodiment 10, does not have a cover or door 70, and also does not have a liquid inlet, outlet, and other associated components which defined and limit a flow path for a working liquid.

MANNER OF USE AND OF OPERATION OF THE PREFERRED EMBODIMENT AND THE VARIATION

The manner of use, and of operation, of the preferred embodiment 10, FIGS. 1-3, and of the variation thereof 110, FIGS. 4-7, can be easily ascertained by any person of ordinary skill in the art from the foregoing description, coupled with reference to the contents of the Figures of the drawing. Accordingly, it is deemed that a description of the obvious use and operation of the invention 10 and 110 is not necessary. However, there are at least two applications, for which the invention 10 and 110 can be adapted, which may not be readily apparent to those of ordinary skill in the art, and which therefore will be discussed hereinbelow.

Firstly, the invention 10 and 110, with air as the working gas, can be adapted to heat a room, an office, and the like, including a house or an entire building. For example, and with reference to FIGS. 5 and 2, the heat-absorbing members 150 and 150A-150D can be used as room dividers, partitions, or the like in a particular room or office where the light-transmissive member 40 is a window. In fact, because of the great structural strength of the mixture 52 of member 50 (and of the mixture 152 of members 150A-150D), either of the mixtures 52 or 152 can be used to form a structural member (such as a wall, even if load-bearing; or the ceiling) of the room or office, and thereby not only resulting in a low cost solar energy heating system for the room, but also resulting in the lowering of the cost of new houses and buildings by saving the cost of building a conventional wall and/or a ceiling in each room in which this solar energy system is to be used.

Secondly, the invention 10 and 110 can be used externally of a house or building, with air as the working gas, to provide cooling air or "air conditioning" to a room in a house or to an office in the building. This can be accomplished most effectively in geographical areas where the temperature differential is large, i.e., where the temperature is relatively cool or cold at night, but is relatively warm or hot during the day. A suitably-sized member made of mixture 52 or 152 is left outdoors during the night, when the "heat" that it absorbs from the cool or cold air is lower in temperature (i.e., is "colder") than the warm or hot air that will be indoors the following day during daylight hours. Then when daylight occurs, the cooled member is brought indoors, and preferably a flow of air is promoted (i.e., caused) in the room by suitable means, such as a fan. The temperature of the air in the room will fall, because of the enhanced heat-absorbing capability of the "cooled" or "cold" heat-absorbing member.

CONCLUSION

It is abundantly clear from all of the foregoing, and from the contents of the Figures of the drawing, that the stated objects of this invention, as well as other objects related thereto, have been achieved.

It is to be noted that, although there have been described and shown the fundamental and unique features of the invention, as applied to a preferred embodiment, a variation thereof, and two novel uses thereof, various other embodiments, variations, adaptations, substitutions, additions, omissions, and the like may occur to, and can be made by, those of ordinary skill in the art.

What is claimed is:

1. A solar energy/storage system, comprising:

a. an insulated container having an opening in optical alignment with a source of solar energy, an internal surface, and an inlet and an outlet for use with a working gas, with said inlet having a fan disposed therein to promote the flow of said working gas;
b. air, as said working gas, flowing into said insulated container through said working gas inlet, throughout said insulated container, and out of said insulated container through said working gas outlet;
c. a light-reflecting metal liner disposed adjacent said internal surface of said insulated container;
d. a light-transmitting member made of light-transparent material disposed over said opening of said insulated container, thereby closing said opening; and
e. a plurality of members made of heat-absorbing material and disposed within said insulated container, wherein said heat-absorbing material comprises a mixture of gypsum in powdered form, lampblack, glass fibers and water, and wherein said members are in the structural cross sectional shape of corrugated sheets having corrugations comprising alternating ridges and grooves, with said ridges of said members being in contact with said grooves of adjacent members and thereby forming voids, and also wherein said members are further disposed such that flow paths for said working air are defined by said inlet with said fan, said light-reflecting liner, the voids between adjacent members, said light-transmitting member, and said outlet.

2. A solar energy collector/storage system comprising:
a. an insulated container having an opening in optical alignment with a source of solar energy, an inlet and an outlet in the structural form of openable and closeable adjustable louvers for use with a working gas, another inlet and another outlet for use with a working liquid, and an internal surface;
b. air, as said working gas, flowing into said insulated container through said working gas inlet, throughout said insulated container, and out of said insulated container through said working gas outlet;
c. water, as said working liquid, selectively flowing into said insulated container through said working liquid inlet and out of said insulated container through said working liquid outlet;
d. a light-reflecting metal liner disposed adjacent said internal surface of said insulated container;
e. a light-transmitting member made of light-transparent material disposed over said opening of said insulated container, thereby closing said opening;
f. a member made of heat-absorbing material and centrally located within said insulated container, wherein said heat-absorbing material comprises a mixture of gypsum in powdered form, lampblack, and water, and wherein said heat-absorbing member has a serpentine shaped conduit therein connected to said working liquid inlet and outlet, with said working water flowing through said conduit, and also wherein said positioning of said centrally located heat-absorbing member is such that a flow path for said working air is defined by said working gas inlet, said light-reflecting liner, said light-transmitting member, and said working gas outlet; and
g. an insulated cover which is dimensioned and configured to fit on and overspread said light-transmitting member and said opening in said insulated container, with said insulating cover having a light-reflecting metal liner attached to a surface of said cover that opposes said light-transmitting member, wherein said cover is attached to said insulated container, and is selectively movable while so attached, such that said cover is useable to cover and to uncover said light-transmitting member, and wherein said cover is selectively positionable such that said light-reflecting metal liner attached to said cover is in optical alignment with said source of solar energy.

* * * * *